United States Patent [19]

Weingarten

[11] Patent Number: 4,465,258
[45] Date of Patent: Aug. 14, 1984

[54] SLEEVE VALVES

[76] Inventor: Zvi Weingarten, Kibbutz Evron, Post Ashrat, Israel

[21] Appl. No.: 383,594

[22] Filed: Jun. 1, 1982

Related U.S. Application Data

[63] Continuation of Ser. No. 197,968, Oct. 17, 1980, abandoned.

[30] Foreign Application Priority Data

Jun. 18, 1980 [IL] Israel ......................................... 60341

[51] Int. Cl.³ ............................................ F16K 31/145
[52] U.S. Cl. ...................................... 251/5; 251/61.1
[58] Field of Search ................... 251/5, 61.1; 137/493, 137/846, 850, 853

[56] References Cited

U.S. PATENT DOCUMENTS

| | | | |
|---|---|---|---|
| 2,518,625 | 8/1950 | Langstaff | 137/853 |
| 2,645,087 | 7/1953 | Neumann | 137/853 |
| 3,237,616 | 3/1966 | Daigh et al. | 251/5 |
| 3,479,001 | 11/1969 | Dower | 251/5 |
| 3,494,588 | 2/1970 | Kisling | 251/5 |
| 3,936,028 | 2/1976 | Norton et al. | 251/61.1 |
| 3,955,594 | 5/1976 | Snow | 137/493 |
| 4,023,772 | 5/1977 | Ratelband | 251/5 |
| 4,135,550 | 1/1979 | Andersson | 251/5 |

Primary Examiner—Martin P. Schwadron
Assistant Examiner—Sheri Novack
Attorney, Agent, or Firm—Silverman, Cass & Singer

[57] ABSTRACT

The wall of an elastomer sleeve valve is provided with a lip-shaped internal sealing member at a median region of the wall; when the valve is closed, the sealing member forms two lips contacting each other along a substantially diametral plane to produce sealing, and contacted lips have arcuate ends joining them so that they produce the seal without causing undue stresses in the sleeve wall. In a preferred embodiment the lips contact each other when no hydraulic pressures are imposed on the sleeve in the rest state.

2 Claims, 2 Drawing Figures

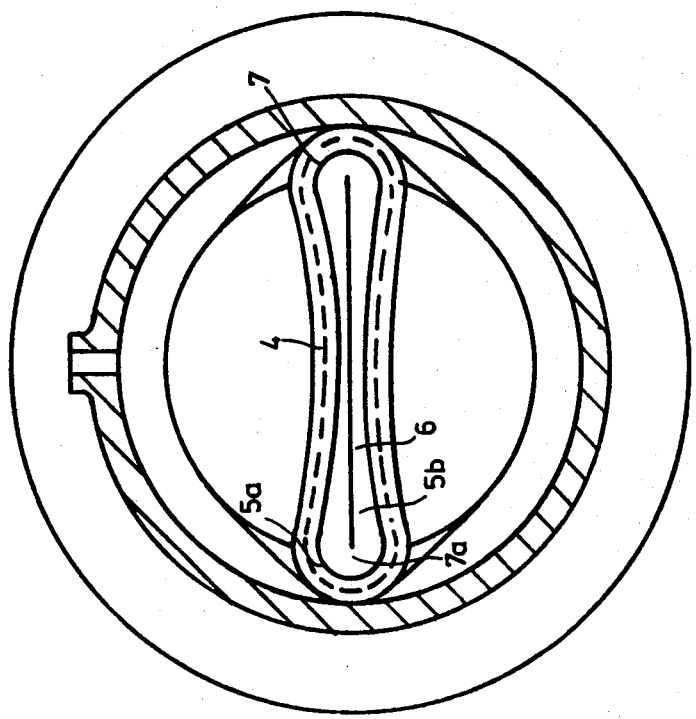
F I G. 2
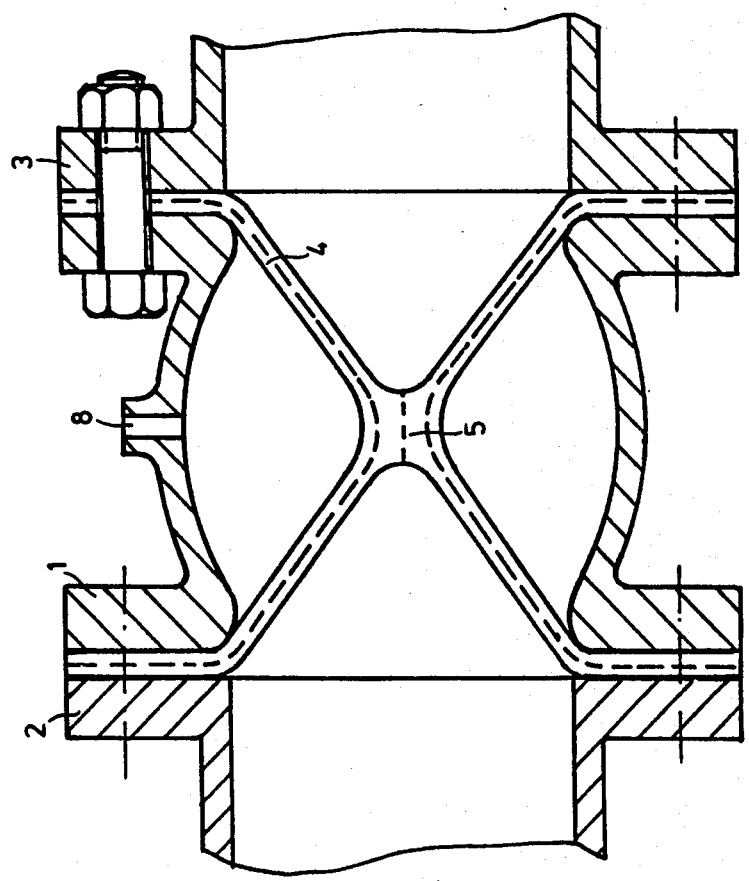
F I G. 1

SLEEVE VALVES

This is a continuation, of application Ser. No. 197,968 filed Oct. 17, 1980, abandoned.

The present invention concerns sleeve valves, i.e. valves which comprise as the valve element an axially disposed resilient flexible sleeve of an elastomer through which passes the flow passage and on which pressure is applied from the outside to pinch it closed when the flow is to be interrupted. Such a valve will hereinafter be designated as a valve of the kind defined.

Said sleeve is generally housed in a housing and the closing or pinching is effected by mechanical means such as clamps. The closing can also be effected by hydraulic or pneumatic pressures which are directly applied to the outside of the sleeve wall in order to close it. In this case these pressures are generally greater than the throughflow pressure. In particular, when the sleeve wall comprises strong reinforcements, as is generally the case, the closing or pinching pressure must be great.

The only known means to close sleeve valves with pressures equal to the internal flow pressure comprises a body located within the sleeve, the wall of the sleeve being applied around the body to close the flow passage.

In general these types of valves are mainly used for industrial purposes and can only be used when the outside pressure to pinch it closed is greater than the pressure of the internal flow.

It is an object of the present invention to provide a sleeve valve having a resilient flexible sleeve of an elastomer of any suitable diameter, which can be actuated by an outside hydraulic or pneumatic pressure not necessarily greater than the internal pressure in the throughflow line, or may even be equal to the latter.

It is a further object of the invention to provide a sleeve valve which permits two-way flow.

The invention consists in a sleeve valve of the kind defined, wherein means are provided in the median region of the elastomer sleeve to permit its walls in the state of rest, i.e. when no hydraulic pressures exist, to be applied to each other along a substantially diametral plane, to attain a perfect seal at external pressures equal to or greater than the internal flow pressure without causing undue stresses in the wall.

Said means may be the provision of different wall thicknesses, the provision of internal reinforcements unequally spaced around the circumference, or the provision of imparting variations in inherent hardness of the elastomer of the sleeve.

Said means may also be constituted by an integral sealing member of a given lip-like shape having such contour that in the closed condition of the valve the internal contact surface provides a perfect seal, while the external shape at the ends of said lips has an arcuate configuration which permits the sleeve walls to be applied against each other without causing undue stresses.

The said sealing member may be integrally cast with the wall of said sleeve or may be made separately and be attached within it as an integral unit.

The invention is illustrated, by way of example only, in the accompanying drawings in which:

FIG. 1 is a longitudinal section of one embodiment of the sleeve valve according to the invention in the closed position.

FIG. 2 is a cross-section thereof.

As shown in FIGS. 1 and 2 the sleeve valve comprises a flanged housing 1, a flanged upstream pipe 2 and a flanged downstream pipe 3. A tubular sleeve 4 of an elastomer is held between the flanges of housing 1 and those of pipes 2 and 3, all as known per se.

According to the invention sleeve 4 is made integral in its median section with an internal sealing member 5 of a given lip-like shape having such contour that in the closed condition of the valve, i.e. in the state of rest, when no hydraulic pressures are applied, the internal contact surfaces provide a perfect seal while the external shape at the ends 7a and 7b of said lips have an arcuate configuration which permits lips 5a and 5b to be applied against each other without causing undue stress in the sleeve wall. Thus, when hydraulic or pneumatic pressure acts on the outside of sleeve 4 through opening 6 in housing 1, as known, the sleeve is pinched in its median region and closes the passage. The sealing member here is integrally cast with the sleeve wall, but it may also be a separate part attached in any suitable manner to the sleeve wall.

Instead of the above described embodiment having a sealing member, the sleeve wall may itself be provided with means for closing the valve at the pressure of the flow through it. This means can be a variation of the hardness of the elastomer around the circumference of said median section of the sleeve or a variation in thickness thereof.

Alternatively reinforcements may be integrally moulded with the sleeve as known. However, the spacing and/or strength of said reinforcements will vary around the circumference of the sleeve.

Instead of the flanged housing as shown, any other suitable housing in which the tubular sleeve 4 can be securely held, may be provided.

I claim:

1. In a flow passage sleeve valve having a housing capable of being internally pressurized, and an elastomer sleeve positioned within the housing and extending longitudinally therein, said elastomer sleeve being defined by a generally constant thickness wall tapering inwardly from opposed substantially circular end portions to a narrow transversely elongate median region of greater transverse width than the circular end portions, the sleeve wall, at the median region, being internally enlarged relative to the wall thickness for the full transverse width of the sleeve to define an internal integral sealing member as an annular, inward projection forming a pair of transversely extending lips, said lips being transversely elongate across substantially the full width of said median region and integrally joined to each other at the opposed ends thereof, said median region forming an arcuate configuration at each of the joined ends of the lips to allow flexure of said lips relative to each other and engagement of the lips in sealed relationship without undue stress in said elastomer sleeve, said median region being configured to retain said lips closed in the absence of pressure both internally and externally of the elastomer sleeve, and further comprising means for imposing external pressure directly upon said lips and said sleeve to produce direct sealing engagement of said lips in a single action at external pressures equal to or greater than internal flow pressure on said sleeve.

2. A valve as claimed in claim 1 wherein said elastomer sleeve is symmetrical to each side of said median region, said lips sealing against two-directional flow.

* * * * *